Figure 1:
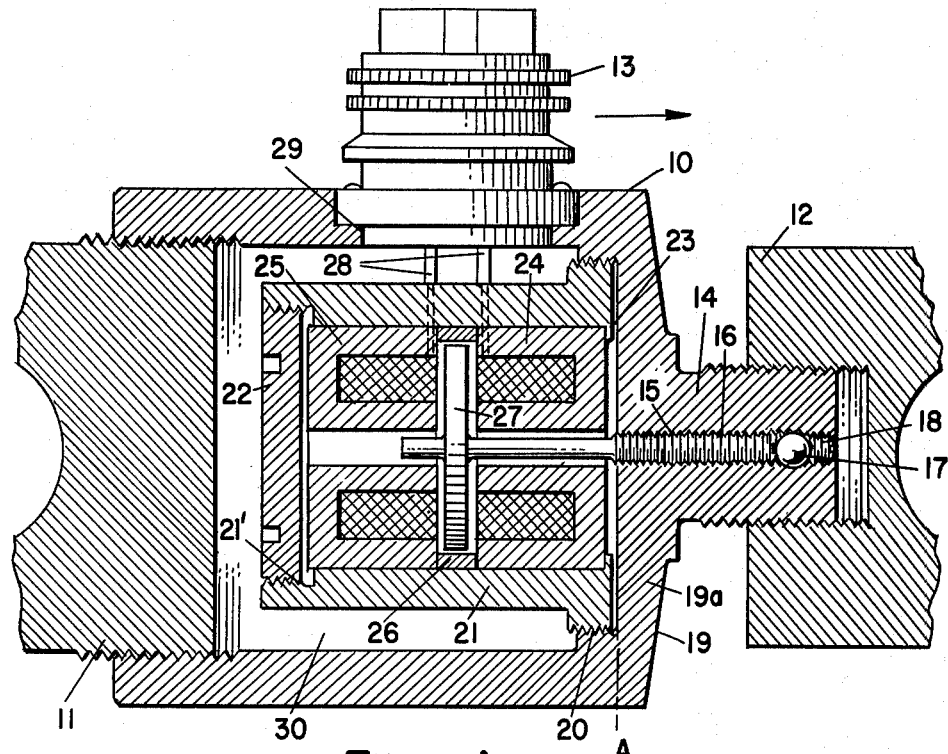

March 22, 1966     I. L. GLERUM     3,241,359
THERMALLY BALANCED LOAD CELL DEVICE
Filed May 16, 1963

INVENTOR.
IRVIN L. GLERUM
BY Elliott & Pastoriza
ATTORNEYS 3,241,359
THERMALLY BALANCED LOAD CELL DEVICE
Irvin L. Glerum, Van Nuys, Calif., assignor to W. C. Dillon & Company, Inc., a corporation of California
Filed May 16, 1963, Ser. No. 280,999
7 Claims. (Cl. 73—141)

This invention generally relates to force or load measuring devices, and more particularly concerns an improved construtcion for a load cell casing and coupled parts which embodies a self-compensating structure to eliminate for the most part thermal errors resulting from changes in temperature and to eliminate differential expansion or contraction of the operative mechanical parts of the load cell unit.

In accordance with applicant's co-pending application entitled, "Force Measuring Device," filed October 28, 1960, under Serial Number 65,644, now Patent No. 3,092,995, of which the present application is a continuation in part, load cells embodying the general operating principles of the structure to be hereafter described are now known in the art. One of the problems, however, associated with load cells and other types of load measuring devices is the mechanical error that may be introduced because of expansion or contraction of metal parts of which the device is constructed. It will also be appreciated that certain possibilities also exist with respect to errors that may be introduced because of variations introduced in the electrical circuitry as a result of temperature changes. Compensations for such electrical changes are not deemed to be a part of the present invention which is limited to thermally induced mechanical errors for the most part.

It is, therefore, an object of the present invention to provide an improved load cell and/or force measuring device embodying co-functioning structures to provide for mechanical temperature compensation.

Another object of the present invention is to provide a mechanically thermally balanced load cell construction of a design which may be relatively economically adapted to certain existing load cell constructions.

A still further object of the present invention is to provide an improved load cell construction which is thermally balanced not only with respect to the relatively slow temperature changes, but also with respect to relatively rapid temperature changes.

A still further object of the present invention is to provide an improved force measuring device and/or load cell construction which embodies a rugged and relatively simple construction, and yet which is susceptible of extremely precise and accurate measurements under varying environmental conditions, and, particularly, under varying ambient temperature conditions.

These and other objects and advantages of the present invention are generally achieved by providing in a load cell the combination of a housing having retained therein a transformer support member connected to one end of the housing. The transformer support member has its other end free of the housing or free to "float" therein. The transformer support member, in turn, has disposed therein two axially spaced transformers coupled for movement with the transformer support member.

Disposed axially between the transformer members for movement from and away from said transformer members is an armature. The armature is coupled to a shaft which, in turn, is coupled to the casing. The shaft and the armature are mechanically free of the transformers. With such a construction, the temperature variation which causes movement of the armature support member or shaft relative to a given reference point of the casing will also effect movement of the transformer support member and the rigidly coupled transformers relative to the given point on the casing. Thus, a feature of the present invention is to use the same metal for the transformer support member and for the armature support member, whereby the relative movement of the armature relative to the transformers will be substantially insignificant in the event of any thermal changes. In such a manner, the load cell or force measuring device of the present invention will be self-compensating.

Figure 2:
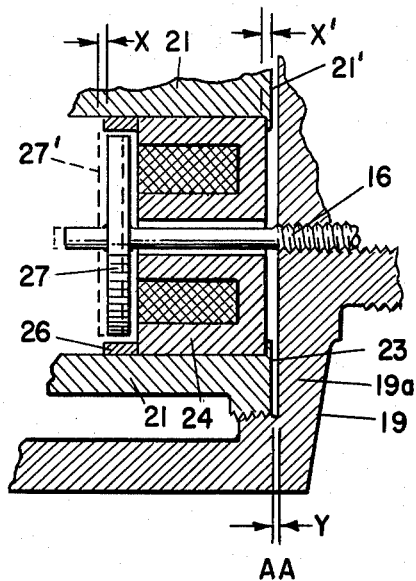

A better understanding of the present invention will be had by reference to the drawings, showing merely an illustrative embodiment and, in which:

FIGURE 1 is the sectional view through a load cell of the present invention; and FIGURE 2 is a view of a part of the load cell of FIGURE 1 to more clearly show the temperature compensating features of the present invention.

Referring now to the drawing, there is shown a casing 10 of generally cylindrical construction to which is threadingly coupled a male pull or shackle plug 11 at one end. At another end there is provided a female pull plug or shackle 12, while at the top of the casing there is shown the conventional "AN" electrical connector 13. The pull plugs are merely shown partially in FIGURE 1 by way of illustration to disclose how the load cell may be used in tension. Of course, by using plugs with flat outer ends, the unit could be used in compression equally well. Such plugs are well known in the art and the tension and compression connections are not deemed to be a part of the present invention.

The casing 10 is provided with a threaded neck 14 for coupling to the female shackle plug 11. The neck 14 is, in turn, provided with a threaded bore 15 which has threadingly connected therein an armature support shaft 16 locked in position by a ball bearing 17 and co-functioning set screw 18. The ball bearing 17 and set screw 18 function as a jam nut to keep the armature support shaft 16 from turning and retained in a given locked position.

The casing 10 is provided with a relatively dome shaped end 19 from which the threaded neck 14 protrudes. The dome shaped end 19 includes a radially outer portion 19a which is designed to flex, because of its relatively thinned out section, as a result of compression or tension loads applied to the opposite ends of the casing 10, for example, through the plugs 11 and 12.

The casing 10 is provided with an inner threaded shoulder 20 proximate the portion 19a of end 19 which is designed to have threadingly coupled thereto a transformer support plug 21. In accordance with a feature of the present invention, the transformer support plug 21 and the armature support shaft 16 are both formed out of the same metal, preferably stainless steel. The lock nut 22 is threadingly connected at 21' to the opposite end of the transformer support plug 21. It will be noted that the end defined in part by the lock nut 22 (of the transformer support plug) is free of the casing 10 and is disposed in spaced relationship to the shackle plug 11 within the load cell casing. It may be noted, in this regard, that a small space is provided between the lock nut 22 and the shackle 11 which may, if desired, be employed for the purpose of some type of electrical components to be housed for use, for example, in conjunction with electrical temperature compensation.

The transformer support plug 21 at its end threaded to the shoulder 20 is provided with a radially inwardly directed flange 23 which serves to partially retain one transformer 24 mounted within the transformer support plug 21. The other transformer unit 25 is spaced from the transformer unit 24 by an annular spacer at 26 which maintains the transformer 24 and 25 in a given axially spaced relationship. It will be noted also that the lock nut 22 co-functions with the flange 23 to maintain the transformers 24 and 25 relatively rigidly disposed within the transformer support plug 21 so that these transformers will move only as a consequence of any movement of the plug 21. Thus, the lock nut is usually up against the transformer 25 such that the transformers 24 and 25 are held against the flange 23.

In accordance with the construction of the above referred to application, the armature support shaft 16 has rigidly affixed thereto, preferably by welding, a disc type armature 27 formed of magnetic material which is designed to move axially back and forth between the transformers 24 and 25 in response to a load or force imposed on the shackle plugs 11 and 12 and corresponding deflection of the end area 19a. An electrical read-out is thereafter obtained through leads 28 leading to electrical apparatus transducing the axial movement of the armature and the resulting change in the relative electrical characteristics of the transformers 24 and 25 into a reading indicating the forces or loads imposed upon casing 10 through the shackle plugs 11 and 12 and the structures coupled thereto.

The operation of the load cell has already been described relative to the movement of the armature 27 and the corresponding electrical read-out in response to flexing of the end area 19a. By the construction as described above, applicant is also able to provide a relatively accurate self-compensating movement of the armature and related transformers 24 and 25 even under varying temperature conditions.

Thus, looking at the view of FIGURE 2, and considering a reference line "A" in alignment with the interior end surface of the dome shaped end 19, it can be assumed that the portion of the casing to the right, as viewed in FIGURES 1 and 2, will move in one direction while that portion of the casing 10 to the left of the reference line "A" will move in the opposite direction.

In consequence with a construction in which the armature support shaft 16 and the transformer support plug 21 are formed of the same material, for example, stainless steel, an increase in temperature will cause the armature support shaft 16 to expand or elongate a given distance "x" which is reflected in FIGURE 2 by the dotted line changing position of the armature 27 to the position 27'.

Similarly, such an increase in temperature will cause the transformer support plug 21 to also lengthen a given distance X' which will be substantially equal to "x" except for the displacement of the end 21' of the transformer support plug from the inner end face of the dome end 19. This distance would only normally measure five ten-thousandths of an inch, a distance which is relatively insignificant compared to the overall length or distance from the reference line A to the center of the armature 27. This error factor, however, is indicated by the distance or denotation "Y," or the distance between A and A', as shown in FIGURE 2. The error factor relative to the compensation will, however, be in the nature of less than 1/10 of 1%. Thus, for any given elongation of the armature support 16, a similar and substantially equal elongation of the transformer support plug 21 will occur; thus, since the transformers 24 and 25 are rigidly coupled for movement with the transformer support plug 21, these transformers will, in turn, move in correspondence with the movement of the transformer support plug 21. Also, since the armature 27 is rigidly coupled for movement with the armature support shaft 16, it will also move a distance corresponding to the elongation of the armature support shaft 16. As a result, the relative movement of the armature 27 to the transformers 24 and 25 will be substantially zero, except for the error factor "Y," which is of no significance relative to the overall length considered from the reference line "A" to the center of the armature 27.

It is, of course, a feature of the invention that the end opposite from the threadedly coupled portion of the transformer support plug be free of the internal portion of the casing 10, as indicated.

In the event any rapid change of temperature occurs which does not immediately affect the armature support member 16, for example, it will be noted that there is an annular air space 30 surrounding the transformer support plug 21 which will tend to insulate this member as well as the armature support member 16. Thus, in the event of any such rapid temperature changes, the internal construction of the load cell will not likely be affected. On the other hand, if the change is sufficiently long enough to affect the transformer support plug 21 overcoming the insulating quality of the air space 30, then it is likely that the armature support member 16 will also be affected and the self-compensating feature introduced.

It will be appreciated that various modifications and changes may be made in the improved thermally balanced load cell of the present invention without affecting the general principles of operation and the primary features of the present invention. Such changes and modifications are deemed to fall within the scope of the claims hereinafter set forth which define the metes and bounds of the present invention.

What is claimed:

1. In a load cell: a generally cylindrical casing having a flexible load responsive portion at a first end thereof; a cylindrical transformer support member having one end supported from said first end of said casing therein and its other end free for movement; a pair of transformers rigidly coupled to and in axially spaced relationship within said transformer support member; a shaft retained by said casing and extending from said flexing portion of said first end to a point within said transformer support member; an armature disc disposed for axial movement between said transformers to co-function therewith in varying the relative electrical outputs thereof in response to flexing of said flexing portion of said first end of said casing, said armature being supported by said shaft, said shaft and transformer support member being formed of the same material and connected to said casing in substantially the same given plane perpendicular to said shaft at said first end, and said shaft and said transformer support member having the same length between said plane and the center of thickness of said armature, whereby expansion or contraction of said shaft responsive to temperature changes will be accompanied, respectively, by an equal expansion or contraction of said transformer support member to compensate said electrical outputs for temperature changes affecting the expansion or contraction of said shaft.

2. In a load cell: a generally cylindrical casing having a flexible load responsive portion at a first end therof; a cylindrical transformer support member having one end supported from said first end of said casing and its other end free for movement therein; a pair of transformers rigidly coupled to and in axially spaced relationship within said transformer support member; a shaft coupled only to said casing and extending from said flexing portion of said first end to a point within said transformer support member; an armature disc disposed for axial movement between said transformers to co-function therewith in varying the relative electrical outputs thereof in response to flexing of said flexing portion of said first end of said casing, said armature being rigidly coupled to said shaft; means for locking said shaft relative to said casing; said shaft and transformer support member being formed of the same material and connected to said casing in substantially the same given plane perpendicular to said shaft at said first end, and said shaft and said transformer support member having the same length between said given plane and the center of thickness of said armature whereby expansion or contraction of said shaft retaining said armature in response to temperature changes will be accompanied by an equal expansion or contraction, respectively, of said transformer support member whereby relative movement between said armature and said transformers will be substantially zero as a consequence of temperature changes in said load cell.

3. The combination according to claim 2, in which said shaft is threaded into said casing and in which said means locking said armature shaft in position relative to said casing comprises a ball positioned against the end of said armature shaft and a set screw fitted into said casing against said ball so as to exert a jamming force against the end of said shaft, whereby said shaft is locked into position such that its threads are firmly engaged in one direction.

4. In a load cell: a cylindrical casing having a flexible load responsive portion at a first end thereof; a cylindrical transformer support member having one end supported from said first end of said casing and its other end free for movement therein, said transformer support member being radially spaced from said casing so as to form an annular air space between said transformer support member and said casing; a pair of transformers rigidly coupled to and in axially spaced relationship within said transformer support member; a shaft coupled only to said casing and extending from said flexing portion of said first end to a point within said transformer support member; an armature disc positioned for axial movement between said transformers to co-function therewith in varying the relative electrical outputs thereof in response to flexing of said flexing portion of said first end of said casing, said armature being supported by said shaft, said shaft and transformer support member being formed of the same metal and connected to said casing in substantially the same given plane perpendicular to said shaft, and said shaft and said transformer support member having the same length between said plane and the center of thickness of said armature, whereby expansion or contraction, respectively, of said shaft in response to temperature changes will be accompanied by equal expansion or contraction of said transformer support member in order to compensate said electrical outputs for thermal changes.

5. The combination according to claim 4, and means locking the armature shaft in position relative to said casing.

6. In a load cell: a cylindrical casing having a flexible load responsive portion at a first end thereof; a cylindrical transformer support member having one end supported from said first end of said casing and its other end free for movement therein; a pair of transformers rigidly coupled to and in axially spaced relationship within said transformer support member, said transformer support member having a radially inwardly extending flange at said one end and a lock nut closing off its other end for retaining said transformers in said rigidly coupled relationship; a shaft coupled to said flexing portion of said first end of said casing in substantially the same given plane perpendicular thereto as said one end of said transformer support member; an armature disc disposed for axial movement between said transformers to co-function therewith in varying the relative electrical outputs thereof in response to flexing of said flexing portion of said first end of said casing, said armature being supported by said shaft, said shaft and transformer support member being formed of the same material and having substantially the same length from said given plane at which each connects to said casing to the center of thickness of said armature disc, whereby an expansion or contraction of said shaft in response to temperature changes would, respectively, be accompanied by similar expansion or contraction of said transformer support member to compensate said electrical outputs for changes in temperature.

7. The combination according to claim 6, in which said transformer support member is radially spaced from and within said casing to form an annular insulating air space.

References Cited by the Examiner

UNITED STATES PATENTS 2,298,216 10/1942 Lamberger et al. ____ 73—141 X
2,930,227 3/1960 Spademan et al. _____ 73—141

FOREIGN PATENTS 704,163 2/1954 Great Britain.

RICHARD C. QUEISSER, *Primary Examiner.*